US012480432B2

(12) United States Patent
Lucht et al.

(10) Patent No.: US 12,480,432 B2
(45) Date of Patent: Nov. 25, 2025

(54) REMOTE DIESEL OXIDATION CATALYST FOR A PRIME MOVER OF A TRANSPORT POWER SYSTEM

(71) Applicant: THERMO KING LLC, Minneapolis, MN (US)

(72) Inventors: Erich A. Lucht, Arden Hills, MN (US); Kyle J. Gleason, Burnsville, MN (US)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 18/827,027

(22) Filed: Sep. 6, 2024

(65) Prior Publication Data

US 2025/0084779 A1    Mar. 13, 2025

Related U.S. Application Data

(60) Provisional application No. 63/581,405, filed on Sep. 8, 2023.

(51) Int. Cl.
*F01N 3/28* (2006.01)

(52) U.S. Cl.
CPC ..................................... *F01N 3/28* (2013.01)

(58) Field of Classification Search
CPC ........ F01N 3/106; F01N 3/035; F01N 13/002; F01N 2590/08; F01N 13/082; F01N 13/1805; F01N 13/1855; F01N 13/20; F01N 2560/08; F01N 2590/06; F01N 3/0231; F01N 3/027; B60K 13/04; B60R 13/0876

See application file for complete search history.

(56) References Cited

U.S. PATENT DOCUMENTS

D369,583 S    5/1996  Shirley
5,606,857 A    3/1997  Harada
(Continued)

FOREIGN PATENT DOCUMENTS

CA    2757698 A1 *  5/2012  .......... F01N 13/143
KR    2003-0050236    6/2003

OTHER PUBLICATIONS

Extended European Search Report, issued in the corresponding European patent application No. 24198904.5, dated Dec. 13, 2024, 8 pages.

*Primary Examiner* — Anthony Ayala Delgado
(74) *Attorney, Agent, or Firm* — HSML P.C.

(57) ABSTRACT

A transport power system for generating power is provided. The transport power system includes an extended mid-pipe having a flexible member and an insulated member that is connected to the flexible member. The flexible member is coupled to an exhaust manifold disposed on a diesel prime mover that is configured to generate exhaust. The extended mid-pipe is configured to receive the exhaust from the exhaust manifold. The diesel oxidation catalyst (DOC) is coupled to the insulated member. The transport power system also includes a housing containing the DOC and the diesel prime mover. The DOC is positioned away from the diesel prime mover such that the DOC is configured to be unstacked in a depth direction of the housing. The insulated member is configured to maintain a temperature of the exhaust to at or above an activation temperature of the DOC.

15 Claims, 6 Drawing Sheets

(56) References Cited

U.S. PATENT DOCUMENTS

| | | | | |
|---|---|---|---|---|
| 6,058,702 | A * | 5/2000 | Jorg Alexnat | F01N 1/24 |
| | | | | 60/322 |
| 9,512,772 | B2 * | 12/2016 | Lucky | F01N 13/143 |
| 2009/0136387 | A1 * | 5/2009 | Picton | B60R 13/0884 |
| | | | | 422/112 |
| 2010/0242462 | A1 | 9/2010 | Smith | |
| 2012/0112452 | A1 * | 5/2012 | Stalcup, II | F01N 13/1816 |
| | | | | 285/145.5 |
| 2012/0247861 | A1 * | 10/2012 | Mizuno | F01N 3/00 |
| | | | | 60/272 |
| 2014/0182730 | A1 | 7/2014 | Uchida | |
| 2016/0017778 | A1 | 1/2016 | Sandou et al. | |
| 2016/0024752 | A1 * | 1/2016 | Mitsuda | E02F 9/0866 |
| | | | | 180/296 |
| 2016/0082830 | A1 * | 3/2016 | Okamura | B62D 33/0617 |
| | | | | 180/309 |
| 2025/0084779 | A1 * | 3/2025 | Lucht | F01N 3/103 |

\* cited by examiner

REMOTE DIESEL OXIDATION CATALYST FOR A PRIME MOVER OF A TRANSPORT POWER SYSTEM

FIELD

This disclosure relates generally to exhaust assemblies for a prime mover of a transport power system. More specifically, the disclosure relates to an exhaust assembly having a diesel oxidation catalyst (DOC) disposed away from the diesel prime mover for reducing the size profile of a housing storing the transport power system.

BACKGROUND

A transport climate control system (TCCS) can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

Auxiliary power units (APUs) can be used with tractors to reduce fuel consumption, maintenance costs, emissions, and noise generated when a tractor prime mover idles during driver rest periods or other periods of vehicle non-movement. Some auxiliary power units are used in conjunction with multiple control systems to power vehicle functions such as heating, cooling, engine warming, lighting, or powering other vehicle functions and operator convenience accessories.

A prime mover can be used to power the TCCS or APU. The prime mover may generate exhaust that is directed to the exhaust assembly before being emitted into the environment.

SUMMARY

This disclosure relates generally to exhaust assemblies for a prime mover of a transport power system. More specifically, the disclosure relates to an exhaust assembly having a diesel oxidation catalyst (DOC) disposed away from the diesel prime mover for reducing the size profile of a housing storing the transport power system.

The exhaust from a diesel prime mover can contain pollutants and particulate matter such as nitro oxides (NOx), carbon oxides CO, soot, and the like. An exhaust assembly for the diesel prime mover can remove and emit the exhaust into the environment. The exhaust assembly can include a diesel oxidation catalyst (DOC) to remove at least some of the pollutants in the exhaust.

The DOC is configured to operate at a temperature at or above an activation temperature for removing pollutants from exhaust flowing through the DOC. The exhaust leaving the prime mover can generally heat the DOC at or above the activation temperature. The DOC can be generally provided in a cylindrical casing with the inlet and the outlet respectively disposed on one of two flat ends of the cylinder. The radius of the cylinder can be similar to a depth of the prime mover.

In some embodiments, the prime mover can be disposed in a transport climate control unit or an auxiliary power unit (APU) having mechanical components, electrical sensors, and/or the like. The housing can be generally disposed at an end of a transport unit (e.g., a climate controlled container) or a tractor. During transport, the housing can be generally disposed between the tractor pulling the transport unit. The clearance between the back of the tractor and the front of the transport unit can be limited due to the configuration of the tractor or the transport unit. To have a thinner housing fit inside this clearance, the DOC and the prime mover can be arranged in an unstacked relationship in the thickness direction of the housing. In such an arrangement, the depth of the housing may be required to accommodate the wider one of the DOC and the prime mover as the other could fit in a different mounting location within the housing.

In some embodiments, an extended mid-pipe connected to the DOC at one end and the prime mover can be provided. The extended mid-pipe can allow the DOC to be disposed in a remote mounting location at a distance away from the prime mover. The extended mid-pipe can be insulated to reduce heat lost along the extended flow path in the extended mid-pipe to provide an exhaust temperature at the DOC that is at or above the activation temperature of the DOC. The extended mid-pipe can be long and flexible and can also dampen noise and vibration created by the prime mover during operation.

In an embodiment, a transport power system for generating power is provided. The transport power system includes an extended mid-pipe having a flexible member and an insulated member that is connected to the flexible member. The flexible member is coupled to an exhaust manifold disposed on a diesel prime mover that is configured to generate exhaust. The extended mid-pipe is configured to receive the exhaust from the exhaust manifold. The diesel oxidation catalyst (DOC) is coupled to the insulated member. The transport power system also includes a housing containing the DOC and the diesel prime mover. The DOC is positioned away from the diesel prime mover such that the DOC is configured to be unstacked in a depth direction of the housing. The insulated member is configured to maintain a temperature of the exhaust to at or above an activation temperature of the DOC.

In another embodiment, an extended mid-pipe for an exhaust assembly of a transport power system is provided. The extended mid-pipe includes a flexible member and an insulated member. The flexible member is configured to receive an exhaust from a diesel prime mover. The insulated member is disposed between the flexible member and a diesel oxidation catalyst (DOC). The insulated member is configured to maintain a temperature of the exhaust at or above an activation temperature of the DOC. The flexible member is configured to be coupled to and extend from the prime mover. The insulated member extends in a horizontal direction and then in an upward direction such that an outlet of the extended mid-pipe is configured to be connected to the DOC that is disposed away from an inlet of the extended mid-pipe such that the DOC is configured to be unstacked with the prime mover in a depth direction of a housing containing the DOC and the prime mover.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

This disclosure relates generally to exhaust assemblies for a prime mover of a transport power system. More specifically, the disclosure relates to an exhaust assembly having a diesel oxidation catalyst (DOC) disposed away from the diesel prime mover for reducing the size profile of a housing storing the transport power system.

As defined herein, a prime mover described herein refers to a prime mover of a transport power system (e.g., a prime mover of an auxiliary power unit (APU), a prime mover of a TCCS, or the like), but not to a vehicle prime mover used to move a vehicle. In some embodiments, the prime mover can be a diesel engine. That is, in some embodiments, there can be two or more distinct diesel engines on a same vehicle: one can be a main/vehicle (e.g., tractor, truck, or the like) engine used to move the vehicle, and the other can be an auxiliary engine (e.g., a diesel powered compression ignition engine) of the transport power system.

Figure 1A:
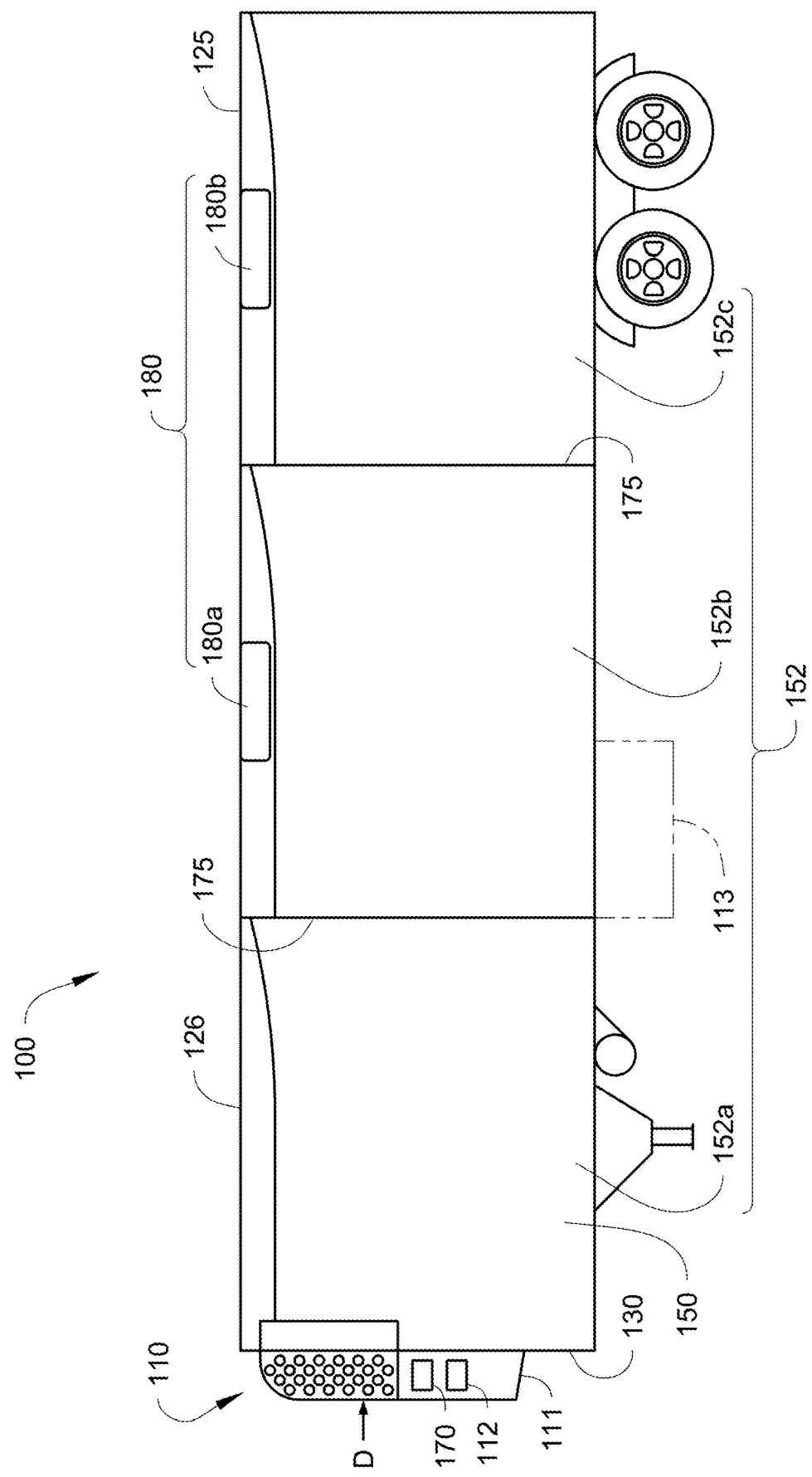
FIG. 1A illustrates a schematic cross sectional side view of a refrigerated transport unit with a multi-temp transport climate control system (MTCS), according to an embodiment.

FIG. 1A illustrates one embodiment of a multi-zone transport climate control system (MTCS) 100 for a transport unit (TU) 125 that can be towed, for example, by a tractor (not shown). The MTCS 100 includes a TCCU 110 and a plurality of remote evaporator units 180. The TCCU 110 and each of the remote evaporator units 180 provide climate control (e.g. temperature, humidity, air quality, etc.) within a separate zone of the internal space 150. The TCCU 110 can include, amongst other components, a refrigeration circuit that connects, for example, a compressor, a condenser, an evaporator and an expansion valve to provide climate control within the at least one of the zones of the internal space 150. Each of the evaporator units 180 can also be connected to the refrigeration circuit to provide climate control to a particular zone 152 of the internal space 150.

The internal space 150 can be divided into a plurality of zones 152. The term "zone" means a part of an area of the internal space 150 separated by walls 175. It will be appreciated that the invention disclosed herein can also be used in a single zone TCCS. It is further appreciated that, the MTCS 100 or the single zone TCCS can be a climate controlled container transported by rail carts, trucks, trailers, and/or ships.

The MTCS 100 for the transport unit 125 includes the TCCU 110 and a plurality of remote evaporator units 180 configured to provide climate control within each of the zones 152. For example, the TCCU 110 can provide climate control within zone 152a, the remote evaporator unit 180a can provide climate control within zone 152b, and the remote evaporator unit 180b can provide climate control within zone 152c.

The MTCS 100 also includes a MTCS controller 170 and one or more sensors (e.g., Hall effect sensors, current transducers, etc.) that are configured to measure one or more parameters (e.g., ambient temperature, compressor suction pressure, compressor discharge pressure, supply air temperature, return air temperature, humidity, etc.) of the MTCS 100 and communicate parameter data to the MTCS controller 170. The MTCS 100 is powered by a transport power system 112. The TCCU 110 is disposed on a front wall 130 of the TU 125. In other embodiments, it will be appreciated that the TCCU 110 can be disposed, for example, on a rooftop 126 or another wall of the TU 125.

In some embodiments, the MTCS 100 can include an undermount unit 113. In some embodiments, the undermount unit 113 can be a TCCU that can also provide environmental control (e.g. temperature, humidity, air quality, etc.) within the internal space 150 of the TU 125. The undermount unit 113 can work in combination with the TCCU 110 to provide redundancy or can replace the TCCU 110. Also, in some embodiments, the undermount unit 113 can be a transport power system that includes, for example, a generator that can help power the TCCU 110.

As shown in FIG. 1A, the transport power system 112 is disposed in the TCCU 110. In other embodiments, the power system 112 can be separate from the TCCU 110. Also, in some embodiments, the transport power system 112 can include two or more different power sources disposed within or outside of the TCCU 110. In some embodiments, the transport power system 112 can include one or more of a prime mover, a battery, an alternator, a generator, a solar panel, a fuel cell, etc. Also, the prime mover can be a combustion engine or a microturbine engine and can operate as a two speed prime mover, a variable speed prime mover, etc. In some embodiments, for the prime mover, an exhaust assembly can be included to collect or burns off particulate such as carbon, soot, or the like that comes out of the tail pipe. The transport power system 112 can provide power to, for example, the MTCS controller 170, a compressor (not shown), a plurality of DC (Direct Current) components (not shown), a power management unit (not shown), etc. The DC components can be accessories or components of the MTCS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The transport power system 112 can include a DC power source (not shown) for providing DC electrical power to the plurality of DC components (not shown), the power management unit (not shown), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

One embodiment of the transport power system 112 is described below with respect to FIG. 2.

Figure 1B:
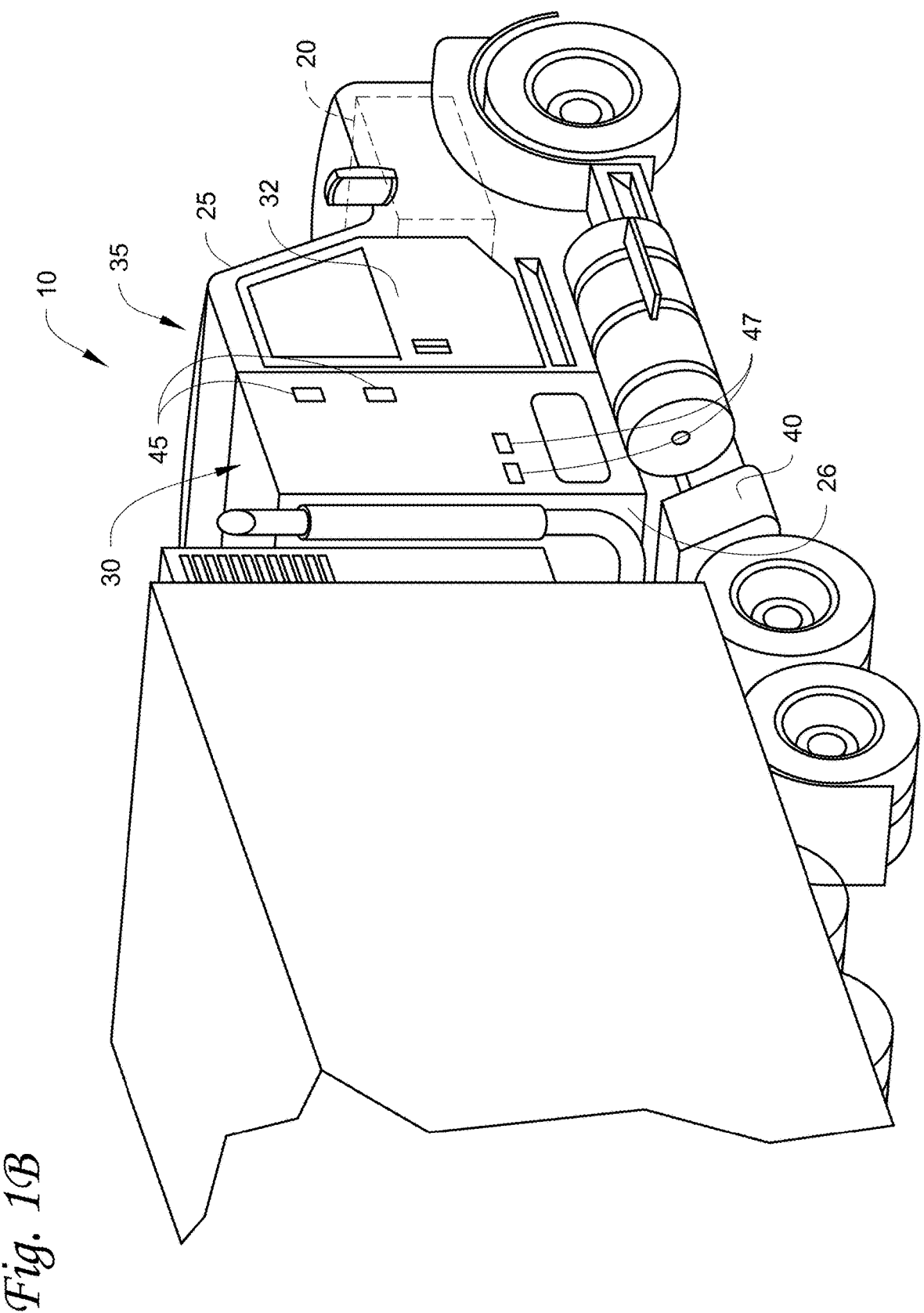
FIG. 1B illustrates a perspective view of a vehicle with an auxiliary power unit, according to an embodiment.

FIG. 1B illustrates a vehicle 10 according to one embodiment. The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the present application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU 40, and a plurality of vehicle accessory components 45 (e.g., electronic communication devices, cabin lights, a primary and/or secondary HVAC system, primary and/or secondary HVAC fan(s), sunshade(s) for a window/windshield of the vehicle 10, cabin accessories, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, a refrigerator, a television, a video game console, a microwave, device charging station(s), a continuous positive airway pressure (CPAP) machine, a coffee maker, a secondary HVAC system for providing conditioned air to the sleeping portion 30.

The primary power source 20 can provide sufficient power to operate (e.g., drive) the vehicle 10 and any of the plurality of vehicle accessory components 45 and cabin accessory components 47. The primary power source 20 can also provide power to the primary HVAC system and the secondary HVAC system. In some embodiments, the primary power source can be a prime mover such as, for example, a combustion engine (e.g., a diesel engine, etc.). In the illustrated embodiment, the APU 40 is a secondary power unit for the vehicle 10 when the primary power source 20 is unavailable. When, for example, the primary power source 20 is unavailable, the APU 40 can be configured to provide power to one or more of the vehicle accessory components, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10. The APU 40 can be controlled by an APU controller 41. In some embodiments, the APU 40 can include a transport power system as described below with respect to FIG. 2.

Figure 1C:
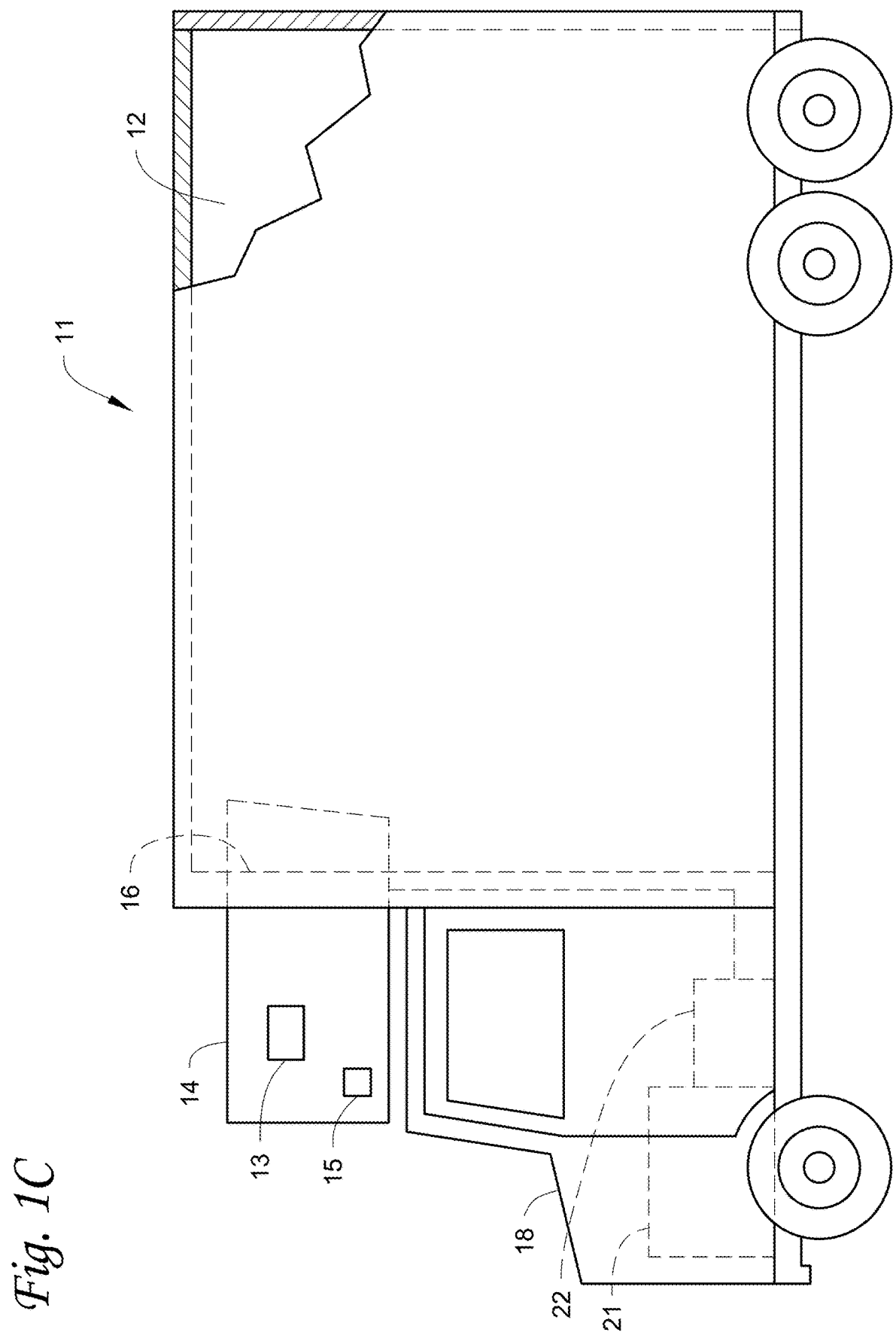
FIG. 1C illustrates a side view of a truck with a front wall mounted vehicle powered transport refrigeration unit, according to an embodiment.

FIG. 1C depicts a temperature-controlled straight truck 11 that includes a conditioned load space 12 for carrying cargo. A transport climate control unit (TCCU) 14 is mounted to a front wall 16 of the load space 12. The TCCU 14 is controlled via a controller 15 to provide temperature control within the load space 12. The truck 11 further includes a vehicle power bay 18, which houses a truck prime mover 21, such as a combustion engine (e.g., diesel engine, etc.), that provides power to move the truck 11. In some embodiments, the truck prime mover 21 can work in combination with an optional machine 22 (e.g., an alternator). The TCCU 14 includes a transport power system 13. In an embodiment, the transport power system 13 can include a combustion engine (e.g., diesel engine, etc.) to provide power to the TCCU 14. In one embodiment, the TCCU 14 includes a vehicle electrical system. Also, in some embodiments, the TCCU 14 can be powered by the transport power system 13 in combination with a battery power source or by the optional machine 22. In some embodiments, the TCCU 14 can also be powered by the truck prime mover 21 in combination with a battery power source or the optional machine 22. One embodiment of the transport power system 13 is described below with respect to FIG. 2.

While FIG. 1C illustrates a temperature-controlled straight truck 11, it will be appreciated that the embodiments described herein can also apply to any other type of transport unit including, but not limited to, a van, a container (such as a container on a flat car, an intermodal container, etc.), a box car, or other similar transport unit.

Figure 2:
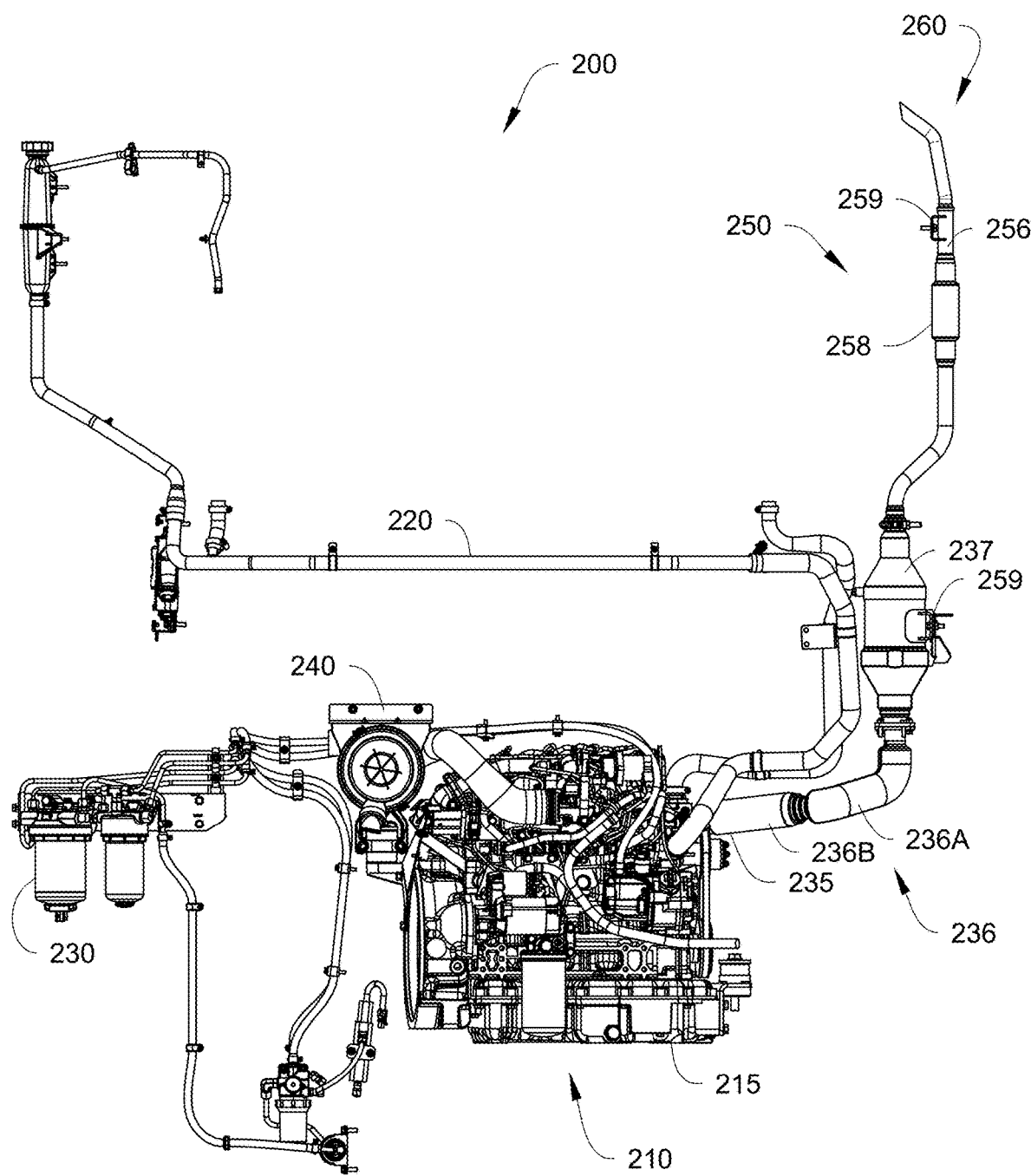
FIG. 2 illustrates a transport power system, according to an embodiment.

FIG. 2 illustrates a transport power system 200 that includes a prime mover assembly 210 and an exhaust assembly 250, according to an embodiment. The transport power system 200 also includes a cooling system 220, a fuel filter 230, and an air filter 240. In an embodiment, the transport power system 200 can also include a control module, a diesel particulate filter (DPF), a blower, a pressure sensor, a control switch, a system indicator, an ambient temperature sensor, and/or the like for controlling and operating the transport power system 200.

The transport power system 200 can be used, for example, as the transport power system 112 shown in FIG. 1A, a transport power system for the APU 40 shown in FIG. 1B, and/or the transport power system 13 shown in FIG. 1C.

For example, in one embodiment, the transport power system 200 can be disposed inside the housing 111 of the TCCU 110. The illustrative example of FIG. 2 can be a view of the transport power system 200 in the TCCU 110 of FIG. 1A from the direction D (shown in FIG. 1A) within the housing 111. In an embodiment, the direction of D can be the opposite of the traveling direction of the carrier transporting the TCCU 110. It is appreciated that the housing 111 might include other components such at climate control system components (e.g., compressor, condenser, evaporator, controller, and/or the like).

The prime mover assembly 210 is configured to provide mechanical power, for example, to power an electrical generator for providing the electricity supplied by the transport power system 200. The prime mover assembly 210 receives a fuel (e.g., diesel fuel), mixes the fuel with air, ignites the fuel-air mixture, and captures energy from fuel combustion to power the electrical generator. In the illustrated example, the prime mover assembly 210 includes a prime mover 215. The prime mover assembly 210 is coupled to the exhaust assembly 250.

In some embodiments, the prime mover 215 is a diesel engine in which fuel mixes with intake air and ignites within the prime mover 215. The fuel combustion creates an exhaust that may include pollutants such as particulate matters, fuel droplets, carbon oxides, nitrogen oxides, or the like. The exhaust leaves the prime mover 215 at a temperature at about the combustion temperature of the fuel. The particulate matters can include soot from incomplete combustion of the fuel. The exhaust leaves the prime mover assembly 210 via an exhaust outlet 235 of the prime mover assembly 210. In some embodiments, the diesel engine produces at least 18.9 kW of mechanical power.

In an embodiment, the exhaust outlet 235 is coupled to the prime mover 215. The exhaust outlet 235 is also coupled with the exhaust assembly 250 for emitting the exhaust from the prime mover assembly 210. The exhaust travels through the exhaust outlet 235 and the exhaust assembly 250 before being emitted and dispersed in the environment. In an embodiment, the prime mover 215 is mounted to a housing (e.g., housing 111 of FIG. 1A) of a TCCU. In an embodiment, the exhaust outlet 235 is an exhaust manifold of the prime mover 210. During operation, the prime mover 210 can create noise and vibration that may be transferred to the housing and/or the exhaust assembly 250.

The cooling system 220 is configured to cool the prime mover assembly 210 during operation. For example, the cooling system 220 can circulate engine coolants between the prime mover assembly 210 and a radiator (not shown) to remove heat from the prime mover assembly 210 and expel the heat to the environment via a radiator (not shown). The fuel filter 230 is configured to filter contaminates from a fuel system before the fuel enters the prime mover assembly 210. The air filter 240 is configured to filter intake air to be supplied to the prime mover 215.

The exhaust assembly 250 is configured to process the exhaust to reduce pollutants before dispersing the exhaust to the environment. The exhaust assembly 250 can be provided for protecting air quality, for cosmetic purposes, for meeting regulatory requirements, and/or the like. In the illustrated example, the exhaust assembly 250 is coupled to the exhaust outlet 235 of the prime mover 215 to receive the exhaust from the prime mover 215. In an embodiment, the exhaust assembly 250 can include an extended mid-pipe 236 to route exhaust from prime mover 215 to processing components of the exhaust assembly 250 such as the DOC 237, a muffler 258, a tail pipe 260, and the like.

The extended mid-pipe 236 is a conduit provided for routing exhaust. The DOC 237 can include catalytic components configured to treat the pollutants in the exhaust. In an embodiment, the DOC 237 can be rigidly attached to a housing (e.g., housing 111 of FIG. 1C) and/or a chassis of a TU.

As shown in FIG. 2, the extended mid-pipe 236 is disposed between the prime mover 215 and the DOC 237 for routing exhaust to the DOC 237 from the exhaust manifold of the prime mover 215. The extended mid-pipe 236 extends laterally from a side of the prime mover 215 and then curves vertically upward to couple with the DOC 237. In an embodiment, the extended mid-pipe 236 can include an insulated member 236A and a flexible member 236B that are fluidly connected to allow exhaust to pass there through. The insulated member 236A is connected to the exhaust outlet 235. The flexible member 236B is connected to the DOC 237.

The extended mid-pipe 236 is configured to maintain thermal energy of the exhaust traveling there through. The insulated member 236B is configured to be continuously insulated throughout for maintaining the temperature and thermal energy of the exhaust. In an embodiment, the insulated member 236A of the extended mid-pipe 236 can include an insulation such as fiber glass, a ceramic fiber material, a super wool, etc. for insulating an entire portion of the insulated member 236B of the extended mid-pipe 236. In an embodiment, the insulated member 236A can include a rigid stainless steel pipe, covered by an insulation that is fixed over the rigid pipe by a stainless steel mesh wrapping around the insulation. In an embodiment, the insulated member 236B extends generally horizontal from the flexible member 236B and then curves upward vertically to couple with the DOC 237.

The flexible member 236B of the extended mid-pipe 236 can be a flexible pipe that is coupled to the exhaust outlet 235 of the prime mover 215 at one end and to the insulated member 236A at the other end. The flexible member 236B is configured to absorb noise and/or vibration transmitted to the DOC 237. The flexible member 236B allows the DOC 237 to be rigidly mounted to the housing while flexibility connected to the prime mover 215. During operation, the prime mover 215 can create noise and vibration. The flexible member 236B can disrupt the transmission of the vibration to the insulated member 236A and the DOC 237 as the DOC 237 is not directly mounted to the prime mover 215. In an embodiment, an internal surface of the flexible member 236B can be corrugated. The internal space of the flexible member 236B can include a helical mesh. The flexible member 236B can include a corrugated inner surface and a tortuous path that can create a barrier to soundwave propagation and reduce noise transmitted to the rest of the exhaust assembly 250. In an embodiment, the flexible member 236B is configured to extend laterally in a generally horizontal direction from the exhaust manifold of the prime mover 215. In an embodiment, the flexible member 236B can include a vibrasorber.

It is appreciated that, during normal operation of the prime mover 215 (e.g., after the prime mover reaches a normal operating temperature), the exhaust can leave the exhaust manifold at a relatively high temperature (e.g., around 400 or 500 degree Fahrenheit and up to 1500 degree Fahrenheit).

In an implementation where the DOC is mounted directly onto the prime mover, a short mid-pipe (e.g., less than 20 inches) may include only a short elbow to redirect the exhaust flow direction into the DOC. As the DOC is directly mounted to the prime mover, it will be appreciated that the DOC would be vibrating with the prime mover during operation. In contrast, the embodiment disclosed herein provides the DOC 237 provided away from the prime mover 215 and not directly mounted to the prime mover 215. Accordingly, the extended mid-pipe 236 is provided and configured to extend over a longer distance (e.g., in a range between 20 inches and 50 inches, such as about 47 or 48 inches) within the housing. The extended mid-pipe 236 may be disposed alongside other components, such as pipes for circulating coolant of the cooling system 220, sensors, fasteners, and/or the like. The other components may not be configured to operate within higher temperatures (e.g., a temperature close to the temperature of the exhaust when exiting the exhaust outlet 235). The insulated member 236A of the extended mid-pipe 236 can prevent heat damage to other components disposed nearby the insulated member 236A of the extended mid-pipe 236.

It is further appreciated that catalysts in the DOC 237 can be designed to operate at a temperature higher than an activation temperature (e.g., 400 or 500 degree Fahrenheit). At a lower temperature, the DOC 237 may be ineffective in removing pollutants from the exhaust. This activation temperature is a temperature generally at about the temperature of the exhaust leaving the exhaust manifold. The insulation of the extended mid-pipe 236 can provide heat retention such that, after the exhaust travels through the entire flow path in the extended mid-pipe 236, the temperature of the exhaust exiting the extended mid-pipe 236 and entering the DOC 237 is at or above the activation temperature of the DOC 237. In an embodiment, the exhaust exiting the extended mid-pipe 236 and entering the DOC 237 can be at or above the exhaust temperature leaving the exhaust manifold.

The muffler 258 is configured to dampen noise traveling through the exhaust assembly 250. In the illustrative example, the muffler 258 may be disposed downstream from the DOC 237.

The tail pipe 260 is disposed at the end of the exhaust assembly 250 opposite to the end coupled to the prime mover assembly 210. The tail pipe 260 can include one or more connected pipes selectively arranged to release the exhaust into the environment, while managing deposit accumulation within the exhaust assembly 250. In some embodiments, the tail pipe 260 can be shaped to avoid fluid (e.g., water such as rain) and/or debris from entering into the exhaust assembly 250.

In the illustrative example of FIG. 2, the exhaust assembly 250 includes one or more mounting brackets 259 for installing the exhaust assembly 250 and/or components of the exhaust assembly 250 directly or indirectly to a housing (e.g., housing 111 of FIG. 1A). In an embodiment, upon installation, the mounting bracket 259 can rigidly attach the exhaust assembly 250 to the housing. For example, the mounting bracket 259 can attach a vertical connector pipe 256, between the DOC 237 and the tail pipe 260, to the housing. In an embodiment, the mounting bracket 259 can attach the DOC 237 and/or the DPF to the housing. For example, the mounting bracket 259 may be one or more L-brackets.

As shown in FIG. 2, the DOC 237 can be positioned vertically above and shifted to the side of the prime mover 210 by providing the extended mid-pipe 236. The extended mid-pipe 236 includes insulation to reduce heat loss over the extended distance that the exhaust will travel within the extended mid-pipe 236 from the prime mover 210 to the DOC 237. Also, the extended mid-pipe 236 can be a flexible pipe that is compatible with the vibration of the prime mover 210 allowing a rigid mounting of the DOC 237 to the housing and/or the insulated member 236A being a rigid member mounted to the DOC 237. In the embodiment shown in FIG. 2, the DOC 237 is not directly mounted on the prime mover 215.

Figure 3:
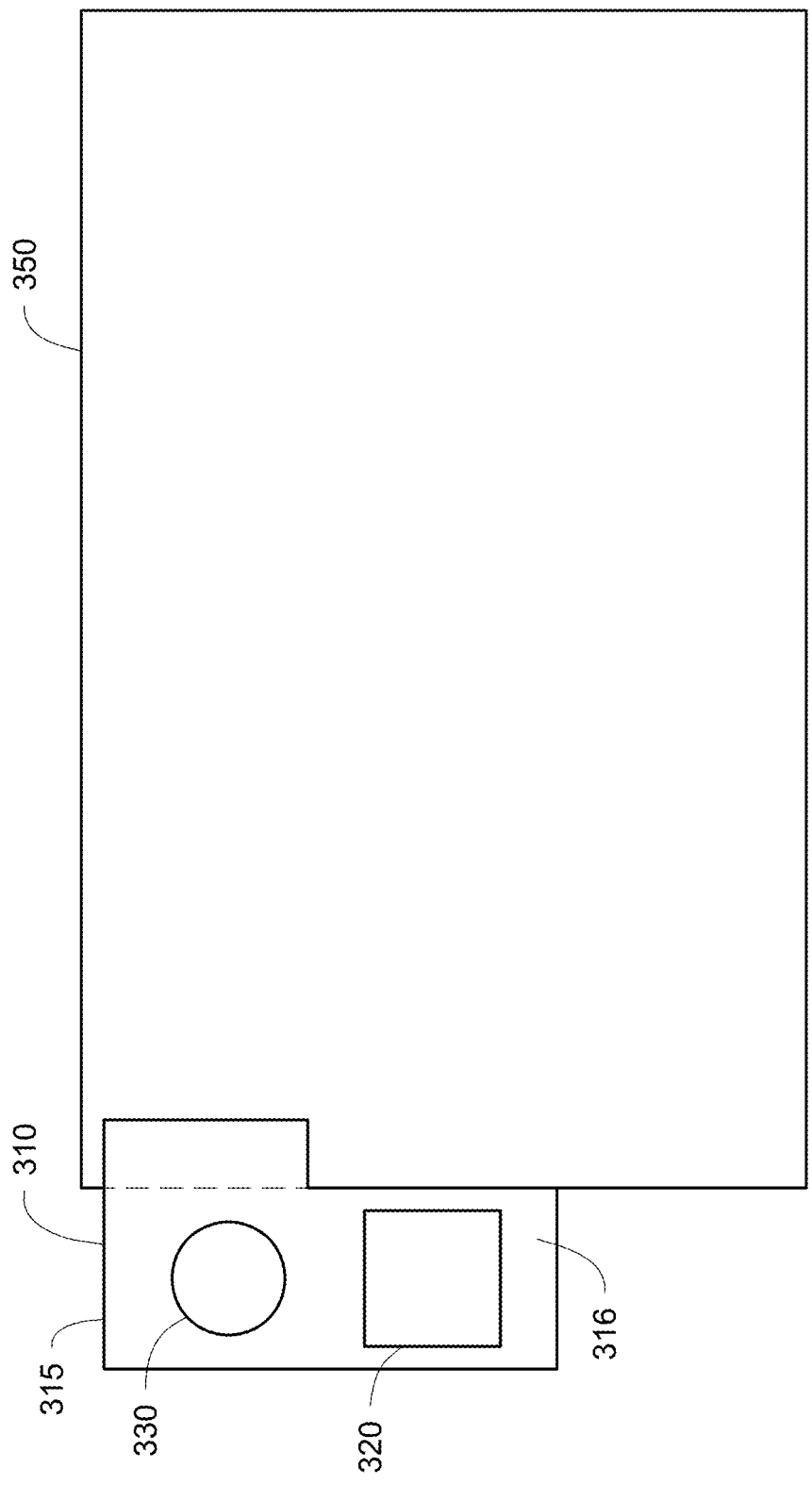
FIG. 3 illustrates a side view of a transport climate control unit attached to a transport unit, according to an embodiment.

FIG. 3 is schematic side view of a TCCU 310 attached to a transport unit 350, according to an embodiment.

As shown in FIG. 3, the TCCU 310 is disposed at one end of the TU 350. It is appreciated that the TU 350 can be the TU 125 as shown in FIG. 1A. As shown in FIG. 2, the TCCU 310 includes a housing 315 that contains a prime mover 320 and a diesel oxidation catalyst (DOC) 330 in the exhaust assembly (not shown) treating the exhaust emitted by the prime mover 320.

It is appreciated that the DOC 330 can have a generally rectangular or cylindrical casing. The DOC 330 can have a depth being the diameter of the cylindrical casing or the dimension between the left and the right edge of the DOC 330 as viewed in illustrated FIG. 3. The prime mover 320 can have a depth being a dimension between the left and the right edge of the prime mover 320 as viewed in illustrated in FIG. 3. The housing 315 can have a depth being a dimension between the left and the right edge of the housing 315 as viewed in illustrated FIG. 2. In an embodiment, the depth can be defined as the smallest dimension of the respective height, length, and depth of the DOC 330, the prime mover 320, or the housing 315.

In trailer applications, the housing 315 is generally disposed in a space between the front wall (e.g., front wall 130 shown in FIG. 1A) of the TU 350 and a back of a tractor (e.g., an exterior rear wall 26 of vehicle 10 shown in FIG. 1B). The clearance in this space (e.g., a distance between the exterior rear wall 26 and the front wall 130 shown in FIG. 1A, or the like) is predetermined by the configuration of the TU 350 and the vehicle. For example, a swing radius (e.g., 19 inches or more) of the tractor can determine a maximum depth of the housing 315 that can be tolerated before the TCCU 310 is required to further extend into the climate control space in the TU 350 for avoiding striking interference with the exterior rear wall of the tractor or equipment mounted on the rear wall. This clearance can then help to determine a maximum depth of the housing 315 of the TCCU 310 before the TCCU 310 has to extend into the internal space of the TU 350 and compete with the cargo capacity of the TU 350. A smaller profile TCCU 310 that fits within the clearance distance can be generally preferable for maximizing the cargo space available in the TU 350.

In railroad applications, a TCCU 310 and the TU 350 can be disposed in a well-car of a railroad car. A well-car generally has a maximum allowable overall length for the TU 350 with the TCCU 310 mounted thereon. Thus, the less the housing 315 extends beyond the TU 350, the longer the TU 350 can be and thus more cargo can fit within the temperature controlled space of the TU 350. The temperature controlled cargo space of 350 can be commercially highly valuable. It is appreciated that the internal space of the TU 350 is generally dimensioned for carrying palletized cargo such that the internal space can maximize the number of palletized cargo stored therein. In some railroad applications, minimizing the size profile of the housing 315 can enable fitting of two additional 40 inches by 45 inch pallets on the floor inside of the TU 350, and an additional two pallets may be stacked on top of the pallets on the floor. Even if a lower part 316 of the TCCU 310 partially extends into the climate controlled space of the TU 350 and occupies a space less than a standard pallet, the TCCU 310 can displace the cargo capacity within the TU 350 by a full row of pallets, disproportionally reducing the actual or usable capacity of the TU 350. For example, even if the TCCU 310 extends into the internal space of the TU 350 a half or a quarter of a size of a standard pallet, the actual or usable capacity within the internal space of the TU 350 can be reduced by a full row of pallets. Accordingly, by maximizing the number of components of the TCCU 310 in the portion of the housing outside the internal space of the TU 350, the climate controlled space of the TU 350 may be fully utilized by palletized cargo, which is generally preferable for transport climate control systems.

In an embodiment, to reduce the depth of the housing 315, the DOC 330 can be disposed vertically above (as in the side view of the FIG. 2) and away from the prime mover 320 as opposed to being directly mounted to a side of the prime mover 320. That is, the DOC 330 is be disposed vertically above and shifted to the side (as shown for DOC 237 and prime mover 215 in FIG. 2.

Figure 4:
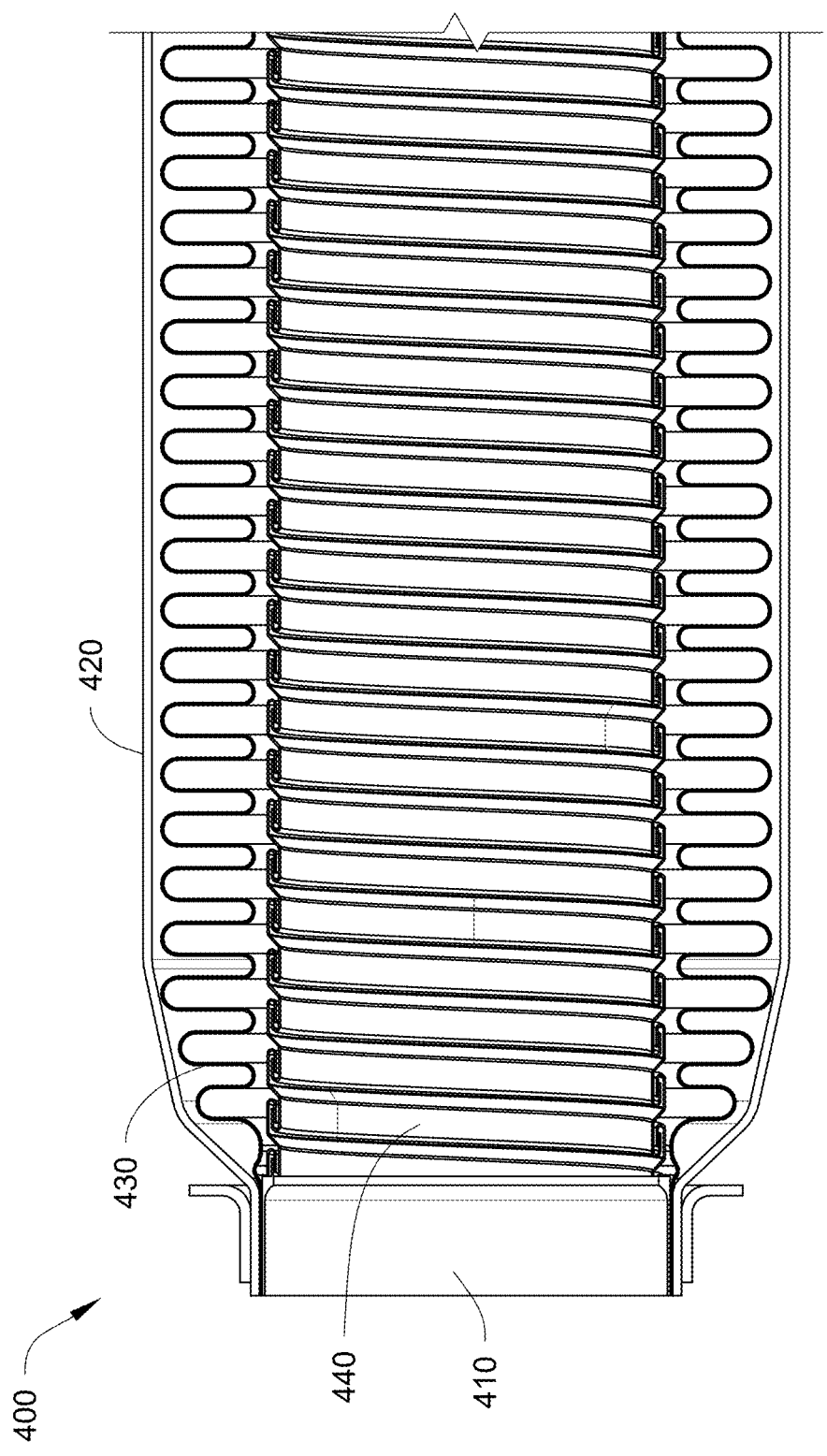
FIG. 4 is a partial cross-sectional view of a flexible member of an extended mid-pipe according to an embodiment.

FIG. 4 is a partial cross-sectional view of a flexible member 400 of an extended mid-pipe according to an embodiment. In an embodiment, the flexible member 400 can be used as the flexible member 236B as in FIG. 2. As shown in FIG. 4, the flexible member 400 can include an inlet 410 that is configured to be connected to the exhaust manifold of the prime mover (e.g., the exhaust outlet 235 of the prime mover 215 as shown in FIG. 2). As shown in FIG. 4, a convoluted stainless steel tube 420 is disposed over a corrugated inner tube 430 for providing a flexible conduit of the flexible member 400. A helical mesh member 440 is disposed in the corrugated tube 430. The internal surface of the corrugated tube 430 and/or the helical mesh member 440 can force the exhaust from the prime mover to travel through a tortuous path in the flexible member 400, which can thereby dampen vibration and noise.

Aspects

It is appreciated that any of aspects 1-8 and 9-13 can be combined.

Aspect 1. A transport power system for generating power, the transport power system comprising:
an extended mid-pipe having a flexible member and an insulated member that is connected to a flexible member, the flexible member coupled to an exhaust manifold disposed on a diesel prime mover that is configured to generate exhaust, wherein the extended mid-pipe is configured to receive the exhaust from the exhaust manifold;
a diesel oxidation catalyst (DOC) coupled to the insulated member; and
a housing containing the DOC and the diesel prime mover,
wherein the DOC is positioned away from the diesel prime mover such that the DOC is configured to be unstacked in a depth direction of the housing, and
wherein the insulated member is configured to maintain a temperature of the exhaust to at or above an activation temperature of the DOC.

Aspect 2. The transport power system of aspect 1, further comprising:
a mounting bracket that fixedly attaches the DOC to the housing, wherein
the flexible member is structurally configured to dampen vibration created by the diesel prime mover.

Aspect 3. The transport power system of any one of aspects 1 or 2, wherein
the insulated member includes a rigid pipe that is covered by an insulation.

Aspect 4. The transport power system of any one of aspects 1-3, wherein
the insulated member extends upward and laterally away from the diesel prime mover for an outlet of the extended mid-pipe to couple with the DOC.

Aspect 5. The transport power system of any one of aspects 1-4, wherein the depth direction of the housing, upon the housing being installed onto a transport unit, corresponds to a length direction of the transport unit such that a width of the housing fits within a clearance on an end of the transport unit.

Aspect 6. The transport power system of any one of aspects 1-5, wherein the DOC is not mounted on the diesel prime mover.

Aspect 7. The transport power system of any one of aspects 1-6, wherein the flexible member includes a convoluted stainless steel tube disposed over a corrugated tube.

Aspect 8. The transport power system of any one of aspects 1-7, wherein the insulated member includes a stainless steel tube covered by an insulation.

Aspect 9. An extended mid-pipe for an exhaust assembly of a transport power system that is configured to generate power, the extended mid-pipe comprising:
a flexible member configured to receive an exhaust from a diesel prime mover; and
an insulated member disposed between the flexible member and a diesel oxidation catalyst (DOC), the insulated member configured to maintain a temperature of the exhaust at or above an activation temperature of the DOC,
wherein the flexible member is configured to be coupled to and extend from the prime mover, and
wherein the insulated member extends in a horizontal direction and then in an upward direction such that an outlet of the extended mid-pipe is configured to be connected to the DOC that is disposed away from an inlet of the extended mid-pipe such that the DOC is configured to be unstacked with the prime mover in a depth direction of a housing containing the DOC and the prime mover.

Aspect 10. The extended mid-pipe of aspect 9, wherein the flexible member is configured to dampen vibration created by the prime mover.

Aspect 11. The extended mid-pipe of any one of aspects 9 or 10, wherein the insulated member includes a rigid pipe that is covered by an insulation.

Aspect 12. The extended mid-pipe of any one of aspects 9-11, wherein the flexible member includes a convoluted stainless steel tube disposed over a corrugated tube.

Aspect 13. The extended mid-pipe of any one of aspects 9-12, wherein the insulated member includes a stainless steel tube covered by an insulation.

What is claimed is:

1. A transport power system for generating power, the transport power system comprising:
an extended mid-pipe having a flexible member and an insulated member that is connected to the flexible member, the flexible member directly coupled to an exhaust manifold disposed on a diesel prime mover that is configured to generate exhaust, wherein the extended mid-pipe is configured to receive the exhaust from the exhaust manifold;
a diesel oxidation catalyst (DOC) coupled to the insulated member; and
a housing containing the DOC and the diesel prime mover,
wherein the DOC is positioned away from the diesel prime mover such that the DOC is configured to be unstacked in a depth direction of the housing,
wherein the insulated member is configured to maintain a temperature of the exhaust to at or above an activation temperature of the DOC,
wherein the insulated member extends in a horizontal direction from the flexible member and curves vertically upward to connect to the DOC, and
wherein the insulated member is directly coupled to the flexible member and to an inlet of the DOC.

2. The transport power system of claim 1, further comprising:
a mounting bracket that fixedly attaches the DOC to the housing, wherein
the flexible member is structurally configured to dampen vibration created by the diesel prime mover.

3. The transport power system of claim 1, wherein
the insulated member includes a rigid pipe that is covered by an insulation.

4. The transport power system of any one of claim 1, wherein
the insulated member extends upward and laterally away from the diesel prime mover for an outlet of the extended mid-pipe to couple with the DOC.

5. The transport power system of claim 1, wherein the depth direction of the housing, upon the housing being installed onto a transport unit, corresponds to a length direction of the transport unit such that a width of the housing fits within a clearance on an end of the transport unit.

6. The transport power system of claim 1, wherein the DOC is not mounted on the diesel prime mover.

7. The transport power system of claim 1, wherein the flexible member includes a convoluted stainless steel tube disposed over a corrugated tube.

8. The transport power system of claim 1, wherein the insulated member includes a stainless steel tube covered by an insulation.

9. The transport power system of claim 1, wherein the flexible member includes a tube disposed over a corrugated tube, and wherein a helical mesh member disposed within the corrugated tube.

10. The extended mid-pipe of claim 1, wherein the flexible member includes a tube disposed over a corrugated tube, and wherein a helical mesh member disposed within the corrugated tube.

11. An extended mid-pipe for an exhaust assembly of a transport power system that is configured to generate power, the extended mid-pipe comprising:
a flexible member configured to receive an exhaust from a diesel prime mover; and
an insulated member disposed between the flexible member and a diesel oxidation catalyst (DOC), the insulated member configured to maintain a temperature of the exhaust at or above an activation temperature of the DOC, wherein the insulated member is configured to be directly coupled to an inlet of the DOC and to the flexible member,
wherein the flexible member is configured to be directly coupled to and extend from the prime mover, and
wherein the insulated member extends in a horizontal direction and then in an upward direction such that an outlet of the extended mid-pipe is configured to be connected to the DOC that is disposed away from an inlet of the extended mid-pipe such that the DOC is configured to be unstacked with the prime mover in a depth direction of a housing containing the DOC and the prime mover.

12. The extended mid-pipe of claim 11, wherein the flexible member is configured to dampen vibration created by the prime mover.

13. The extended mid-pipe of claim 11, wherein the insulated member includes a rigid pipe that is covered by an insulation.

14. The extended mid-pipe of claim 11, wherein the flexible member includes a convoluted stainless steel tube disposed over a corrugated tube.

15. The extended mid-pipe of claim 11, wherein the insulated member includes a stainless steel tube covered by an insulation.

* * * * *